(12) United States Patent
Horikawa et al.

(10) Patent No.: US 8,596,679 B2
(45) Date of Patent: Dec. 3, 2013

(54) AIR BAG DEVICE

(75) Inventors: Jun Horikawa, Yokohama (JP); Takashi Haga, Yokohama (JP)

(73) Assignee: Autoliv Development AB, Vargarda (SE)

( * ) Notice: Subject to any disclaimer, the term of this patent is extended or adjusted under 35 U.S.C. 154(b) by 186 days.

(21) Appl. No.: 12/672,761

(22) PCT Filed: Jul. 23, 2008

(86) PCT No.: PCT/JP2008/063196
§ 371 (c)(1),
(2), (4) Date: Nov. 17, 2010

(87) PCT Pub. No.: WO2009/022527
PCT Pub. Date: Feb. 19, 2009

(65) Prior Publication Data
US 2011/0049850 A1 Mar. 3, 2011

(30) Foreign Application Priority Data
Aug. 10, 2007 (JP) .................................. 2007-210054

(51) Int. Cl.
*B60R 21/201* (2011.01)
*B60R 21/205* (2011.01)
*B60R 21/2334* (2011.01)

(52) U.S. Cl.
USPC ........................................ 280/743.2; 280/732

(58) Field of Classification Search
CPC .................................................... B60R 21/201
USPC ................ 280/732, 728.1, 742, 743.1, 728.2
See application file for complete search history.

(56) References Cited

U.S. PATENT DOCUMENTS 5,393,090 A * 2/1995 Shepherd et al. .......... 280/728.2
5,765,867 A 6/1998 French
(Continued)

FOREIGN PATENT DOCUMENTS

| CA | 2 348 290 A1 | 11/2001 |
|---|---|---|
| DE | 198 13 054 A1 | 10/1999 |

(Continued)

OTHER PUBLICATIONS

JP 2000-247199 English translation.*

(Continued)

*Primary Examiner* — Karen Beck
(74) *Attorney, Agent, or Firm* — Brinks Hofer Gilson & Lione

(57) ABSTRACT

To prevent positional deviation in a folded back portion of a deployment restriction sheet reliably, an air bag device includes an air bag 1, an inflator 7 for deploying the air bag 1 by supplying the air bag with a generated gas, an air bag case 3 used to attach the inflator 7 and store the air bag 1, a retainer 6 for fixing an opening portion peripheral edge of the air bag 1 to the air bag case 3, and a deployment restriction sheet 11 that covers the air bag 1 from a vehicle body rear side to a vehicle body front side when the air bag 1 is stored. In the deployment restriction sheet 11, a folded back portion 11*c* is subjected to tacking 11*d* so as to separate upon application of a predetermined load A, and a rupturable portion 11*e* that ruptures upon application of a predetermined load B, which is larger than the load A, is provided on a first end 11*a* side positioned on the vehicle body front side. The first end 11*a* is attached to an air bag main body. A second end 11*b* is installed on the air bag main body. As a result, positional deviation of the folded back portion does not occur, and a cushioning effect can be applied to an occupant effectively.

6 Claims, 8 Drawing Sheets

(56) References Cited

U.S. PATENT DOCUMENTS

| | | | |
|---|---|---|---|
| 6,131,944 A * | 10/2000 | Henkel et al. | 280/728.3 |
| 6,474,686 B1 * | 11/2002 | Higuchi et al. | 280/743.1 |
| 6,578,866 B2 | 6/2003 | Higashi | |
| 7,631,894 B2 * | 12/2009 | Hasebe et al. | 280/743.2 |
| 7,658,408 B2 * | 2/2010 | Zofchak et al. | 280/743.2 |
| 7,753,407 B2 * | 7/2010 | Yokota | 280/743.2 |
| 7,845,672 B2 * | 12/2010 | Onohara | 280/728.3 |
| 7,850,198 B2 * | 12/2010 | Hayakawa et al. | 280/730.1 |
| 7,878,534 B2 * | 2/2011 | Kumagai et al. | 280/732 |
| 2003/0218323 A1 * | 11/2003 | Berbalk | 280/743.1 |
| 2007/0164542 A1 * | 7/2007 | Matura et al. | 280/728.2 |
| 2009/0189376 A1 * | 7/2009 | Vigeant et al. | 280/742 |
| 2009/0250909 A1 * | 10/2009 | Kuhne et al. | 280/728.2 |
| 2009/0289441 A1 * | 11/2009 | Kakstis et al. | 280/728.1 |
| 2010/0156074 A1 * | 6/2010 | Kubo et al. | 280/737 |
| 2010/0230935 A1 * | 9/2010 | Rose et al. | 280/728.2 |
| 2011/0241317 A1 * | 10/2011 | Lee | 280/729 |
| 2011/0241323 A1 * | 10/2011 | Naganawa et al. | 280/731 |

FOREIGN PATENT DOCUMENTS

| | | |
|---|---|---|
| DE | 101 25 034 A1 | 12/2001 |
| EP | 0 897 352 A | 2/1999 |
| EP | 0 945 312 A2 | 3/1999 |
| ES | 2 212 405 | 7/2004 |
| GB | 2 362 858 A | 12/2001 |
| JP | 11-321515 | 11/1999 |
| JP | 2000-509673 | 8/2000 |
| JP | 2000-247199 | 9/2000 |
| JP | 2001-158320 A | 6/2001 |
| JP | 2001-334900 | 12/2001 |
| WO | WO 97/42061 A1 | 11/1997 |
| WO | WO 2009/022527 A1 | 2/2009 |

OTHER PUBLICATIONS

International Search Report in International Application No. PCT/JP2008/063196, dated Aug. 19, 2008, 2 pages.

* cited by examiner

AIR BAG DEVICE

This application is a National Stage of International Application PCT/JP2008/063196 filed on Jul. 23, 2008, which claims priority to Japanese Patent Application No. JP2007-210054 filed with the Japanese Patent Office on Aug. 10, 2007, the entirety of which is hereby incorporated by reference.

TECHNICAL FIELD

The present invention relates to an air bag device disposed in an automobile, for example.

BACKGROUND ART

Several safety devices are disposed in an automobile to secure occupant safety. An air bag device in which an air bag is deployed by ejecting gas generated by an inflator during an emergency such as a collision serves as one of these safety devices.

In a technique disclosed in relation to this type of air bag device, a folded air bag is stored in an air bag case such that the air bag is covered by a deployment restriction sheet from a vehicle body rear side to a vehicle body front side (Patent Document 1, for example). With this technique, a rapidly deploying air bag is prevented from interfering with an occupant during an early stage of deployment.

Patent Document 1: Japanese Unexamined Patent Application Publication 2001-334900

The vehicle body rear side of the deployment restriction sheet according to Patent Document 1 is fixed, but the vehicle body front side is not fixed and therefore forms a free end.

With the deployment restriction sheet according to Patent Document 1, a position of a folded back portion may shift during travel after the air bag device has been attached to the vehicle body. When the position of the folded back portion of the deployment restriction sheet shifts, the air bag may deploy before the deployment restriction sheet is fully extended, leading to variation in deployment behavior. When the deployment behavior of the air bag varies, a cushioning action cannot be applied to the occupant effectively.

As shown in FIG. 8, to prevent the position of the folded back portion of the deployment restriction sheet from shifting, a deployment restriction sheet 2 is covered from above by a flap 5 having two fixed ends. However, 100% reliability cannot be achieved with this method either.

In FIG. 8, reference number 1 denotes an air bag stored in an air bag case 3 in a folded state, and 4 denotes a lid that is ruptured when the air bag 1 expands. Further, reference number 6 denotes a retainer for fixing an opening portion of the peripheral edge of the air bag 1 to the air bag case 3. The retainer 6 fixes a second end of the deployment restriction sheet 2 on the vehicle body rear side to a second end of the flap 5 using an attachment bolt 6a and a nut 8 fastened thereto.

A problem to be solved by the present invention is that when a folded air bag is covered by a deployment restriction sheet from a vehicle body rear side to a vehicle body front side but only the vehicle body rear side of the sheet is fixed, the position of a folded back portion may shift. A further problem is that even when the deployment restriction sheet is covered by a flap, positional deviation of the folded back portion cannot be prevented with 100% reliability.

In consideration of these points, an air bag device according to the present invention solves the problems described above by fixing both ends of the deployment restriction sheet, providing a rupturable portion on the vehicle body front side of the deployment restriction sheet, and joining the folded back portion of the deployment restriction sheet such that a joint portion separates before the rupturable portion ruptures.

DISCLOSURE OF THE INVENTION

More specifically, an air bag device according to a first invention includes: a folded air bag; an inflator for deploying the air bag by supplying the air bag with a generated gas; an air bag case used to attach the inflator and store the air bag; a retainer for fixing an opening portion peripheral edge of the air bag to the air bag case; and a deployment restriction sheet that covers the air bag from a vehicle body rear side to a vehicle body front side when the air bag is stored in the air bag case. A principal feature of this air bag device is that in the deployment restriction sheet, a folded back portion provided at a midway point is joined so as to separate upon application of a predetermined load A, and a rupturable portion that ruptures upon application of a predetermined load B, which is larger than the load A, is provided on a first end side positioned on the vehicle body front side, and the first end is attached to an air bag main body such that a second end positioned on the vehicle body rear side is fixed by being installed on the air bag main body.

Further, an air bag device according to a second invention includes: a folded air bag; an inflator for deploying the air bag by supplying the air bag with a generated gas; a cloth case for storing the air bag; an air bag case used to attach the cloth case and the inflator; a retainer for fixing an opening portion peripheral edge of the air bag to the cloth case; and a deployment restriction sheet that covers the air bag from a vehicle body rear side to a vehicle body front side when the air bag is stored in the cloth case. A principal feature of the air bag device is that the cloth case is formed in a box shape such that at least an upper surface (a lid side) of the folded air bag is exposed, the deployment restriction sheet is formed by extending at least one side face of the cloth case and folding a resulting extension portion, and a folded back portion formed at a midway point of the extension portion is joined so as to separate upon application of a predetermined load A, and a rupturable portion that ruptures upon application of a predetermined load B, which is larger than the load A, is provided on a tip end side of the extension portion, which is positioned on the vehicle body front side, and joined by the tip end portion.

In the air bag devices according to the present invention, both ends of the deployment restriction sheet are fixed and the folded back portion of the deployment restriction sheet is joined. Therefore, positional deviation in the folded back portion formed on the deployment restriction sheet can be prevented after the air bag device is attached to the vehicle body.

Further, the joint portion of the folded back portion separates before the rupturable portion ruptures. Hence, the air bag deploys once the deployment restriction sheet is fully extended, and therefore the deployment behavior of the air bag does not vary. As a result, a cushioning effect can be applied to an occupant effectively.

In the present invention, both ends of the deployment restriction sheet are fixed and the folded back portion of the deployment restriction sheet is joined. Therefore, positional deviation in the folded back portion formed on the deployment restriction sheet can be prevented. At this time, the joint portion of the folded back portion separates before the rupturable portion ruptures, and therefore the air bag deploys once the deployment restriction sheet is fully extended. As a result, a cushioning effect can be applied to an occupant effectively.

BRIEF DESCRIPTION OF THE DRAWINGS

FIG. 5 is an illustrative view of the deployment restriction sheet provided in the air bag device according to the first invention, wherein FIG. 5(a) is a development diagram, FIG. 5(b) is a sectional view of the folded back portion, and FIG. 5(c) is a view illustrating a length of the deployment restriction sheet;

FIG. 6 is a view showing another example of the air bag device according to the first invention when disposed in a front seat, wherein FIG. 6(a) is an exploded perspective view and FIG. 6(b) is an illustrative view showing the manner in which a first end of the deployment restriction sheet is joined;

Figure 1:
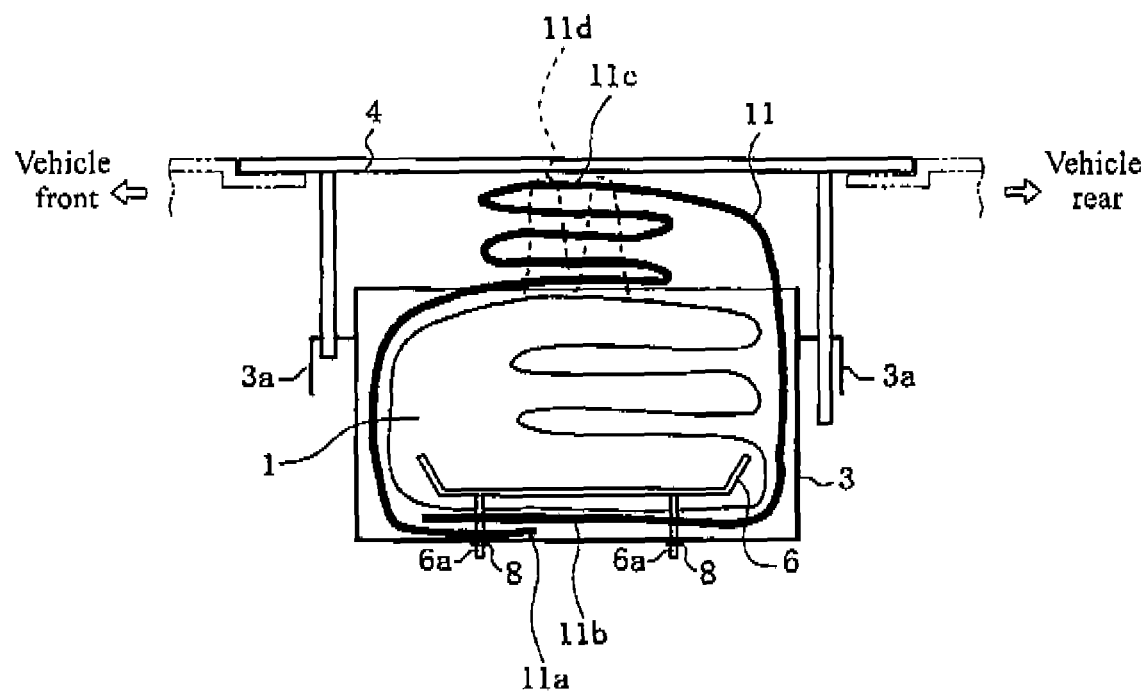
FIG. 1 is a schematic sectional view illustrating an example of an air bag device according to a first invention.
Figure 2:
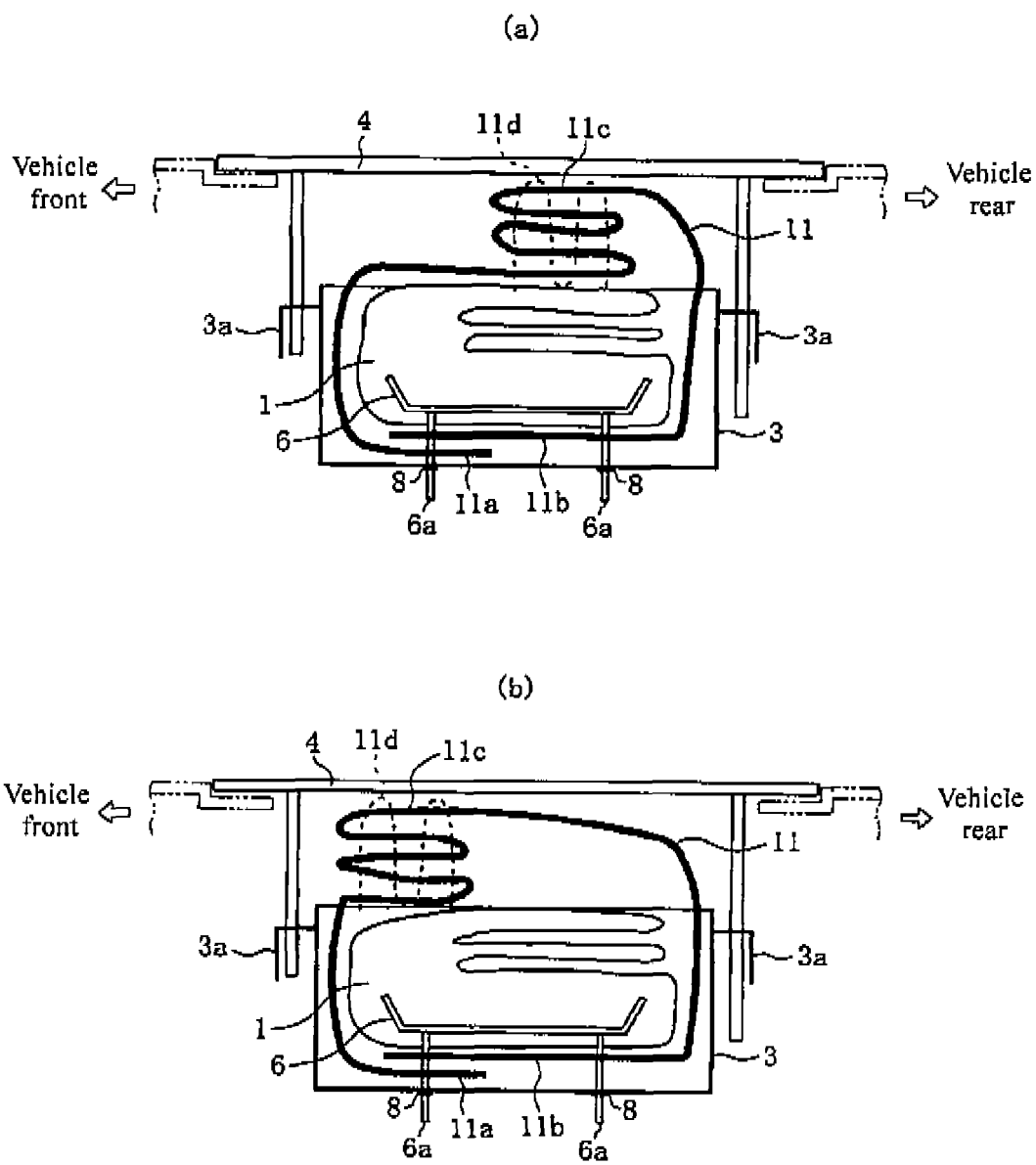
FIGS. 2(a) and 2(b) are views illustrating a position of a folded back portion of a deployment restriction sheet provided in the air bag device according to the first invention shown in FIG. 1.
Figure 3:
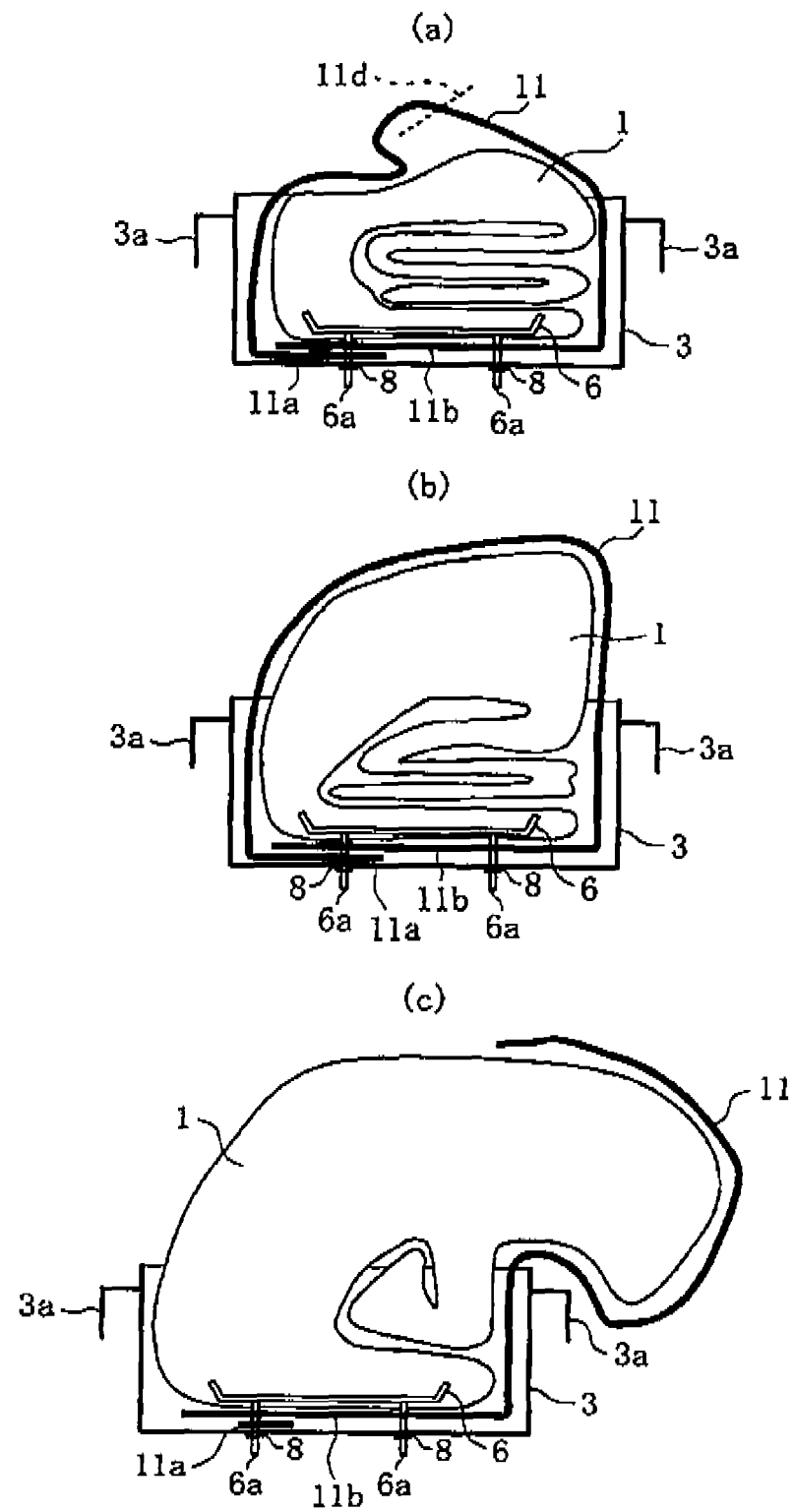
FIGS. 3(a) to 3(c) are views illustrating a deployment behavior sequence of the air bag device according to the first invention shown in FIG. 1.

DESCRIPTION OF THE REFERENCE NUMERALS 1 air bag
3 air bag case
3a hook
4 lid
6 retainer
6a attachment bolt
7 inflator
11 deployment restriction sheet
11a first end
11b second end
11c folded back portion
11d tacking
11e rupturable portion
12 cloth case

BEST MODE FOR CARRYING OUT THE INVENTION

When a folded air bag is covered by a deployment restriction sheet from a vehicle body rear side to a vehicle body front side but only the vehicle body rear side of the sheet is fixed, the position of a folded back portion may shift. Even when the deployment restriction sheet is covered by a flap, positional deviation of the folded back portion cannot be prevented with 100% reliability.

The present invention prevents positional deviation of a folded back portion formed on a deployment restriction sheet by fixing both ends of the deployment restriction sheet and joining the folded back portion of the deployment restriction sheet.

Embodiments of the present invention will be described below using FIGS. 1 to 7.

FIGS. 1 to 6 are views illustrating an example of an air bag device according to a first invention. FIG. 7 is a view illustrating a cloth case and a deployment restriction sheet of an air bag device according to a second invention.

Reference numeral 1 denotes a folded air bag stored in an air bag case 3. The air bag 1 is covered by a deployment restriction sheet 11 from a vehicle body rear side to a vehicle body front side. A first end 11a and a second end 11b of the deployment restriction sheet 11, which are positioned on the vehicle body front side and the vehicle body rear side respectively, are both fixed.

The first end 11a and second end 11b of the deployment restriction sheet 11 may be fixed using any method and any constitutional component as long as both ends 11a, 11b can be fixed.

For example, in an example shown in FIGS. 1 to 5, the two ends 11a, 11b of the deployment restriction sheet 11 are fixed to an air bag main body by inserting an attachment bolt 6a of a retainer 6 into the respective ends 11a, 11b and fastening the attachment bolt 6a using a nut 8.

Figure 6:
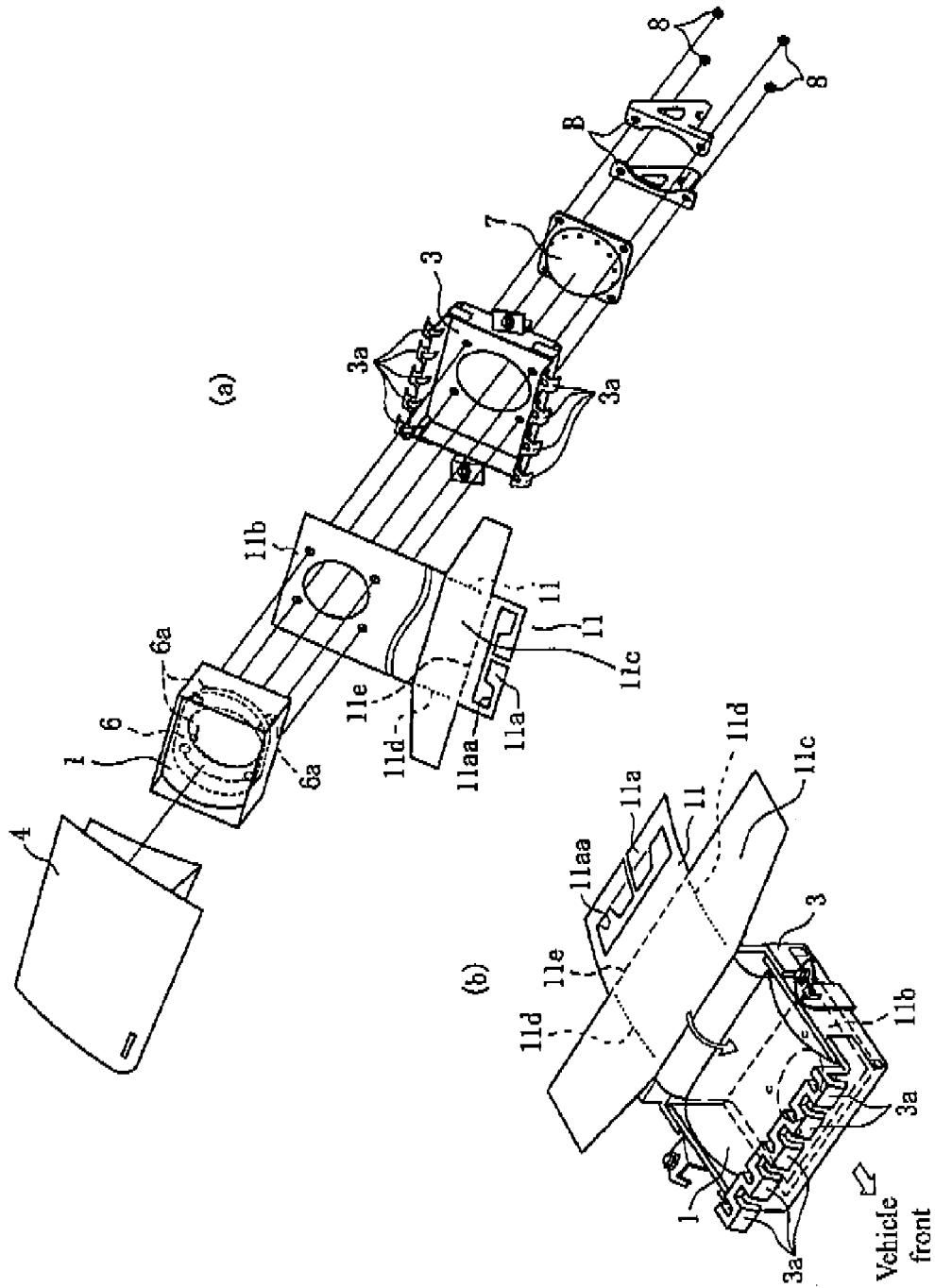
Figure 7:
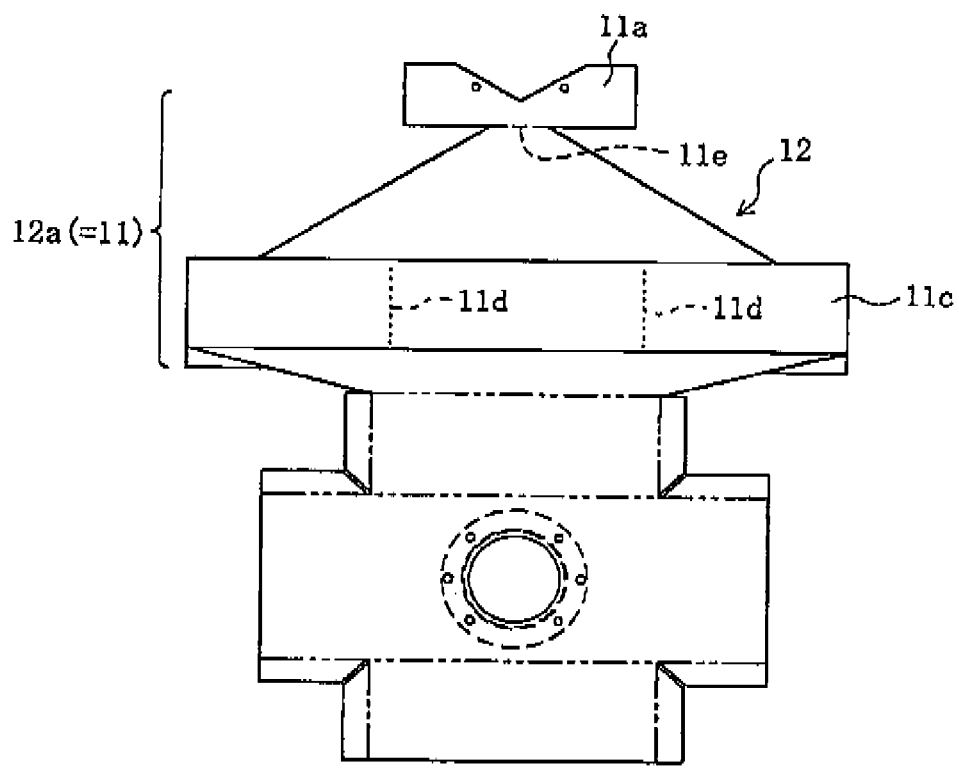
FIG. 7 is an illustrative view of a cloth case and a deployment restriction sheet provided in an air bag device according to a second invention.
Figure 8:
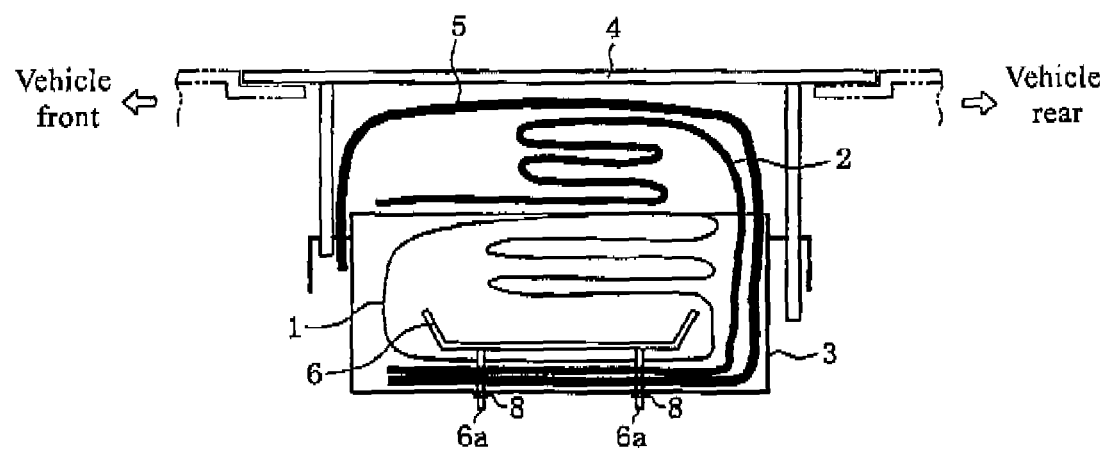
FIG. 8 is a schematic sectional view illustrating an example of a conventional air bag device.

In an example shown in FIG. 6, on the other hand, the second end 11b of the deployment restriction sheet 11 is fixed to the air bag main body using the attachment bolt 6a of the retainer 6 and the nut 8, similarly to the example shown in FIGS. 1 to 5, whereas the first end 11a is fixed by providing an engagement hole 11aa on the first end 11a side and engaging the engagement hole 11aa with a hook 3a attached to a side wall of the air bag case 3 on the vehicle body front side. Note that B in FIG. 6 denotes a bracket for fixing the air bag case 3 to the vehicle body.

Furthermore, in the present invention, a folded back portion 11c provided at a midway point of the deployment restriction sheet 11 is joined by tacking 11d or the like, for example, and a rupturable portion 11e constituted by perforations or the like, for example, is provided on the first end 11a side of the deployment restriction sheet 11 (see FIGS. 5(a) and 5(b)).

The tacking portion 1 1d is formed to separate when a predetermined load A is applied, while the rupturable portion 11e is formed to rupture when a predetermined load B, which is larger than the load A, is applied.

By constituting the present invention in this manner (i.e. by fixing the two ends 11a, 11b of the deployment restriction sheet 11 and joining the folded back portion 11c), the folded back portion 11c does not shift after the air bag device has been attached to the vehicle body. As a result, a flap 5 can be omitted.

Further, regardless of whether the folded back portion 11c is positioned toward the rear of the vehicle body, as shown in FIG. 2(a), or the front side of the vehicle body, as shown in FIG. 2(b), the air bag 1 deploys only once the deployment restriction sheet 11 is fully extended.

More specifically, when gas is emitted from an inflator 7 and supplied to the air bag 1, the air bag 1 deploys such that a load is applied to the deployment restriction sheet 11. When the load reaches A, the thread of the tacking 11d breaks (see FIG. 3(a)).

The deployment restriction sheet 11 then expands together with the deployment of the air bag 1, and when the deployment restriction sheet 11 is fully extended, the load applied to the deployment restriction sheet 11 via the air bag 1 increases.

Figure 4:
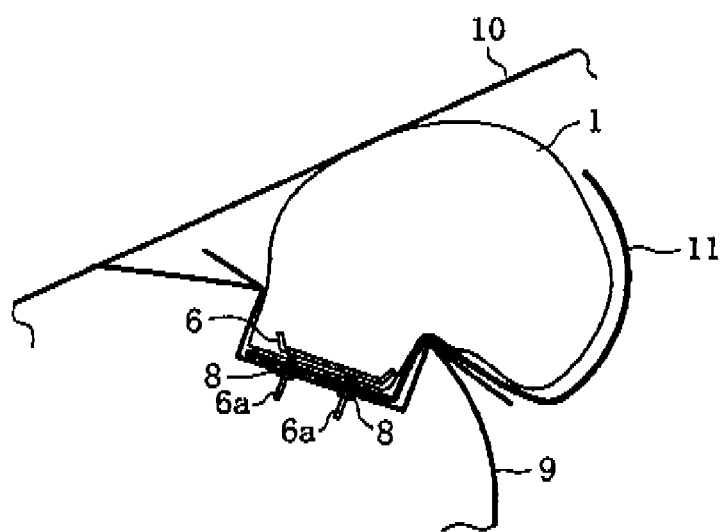
FIG. 4 is a view showing a deployment state of the air bag device according to the first invention when disposed in a front seat.
Figure 5:
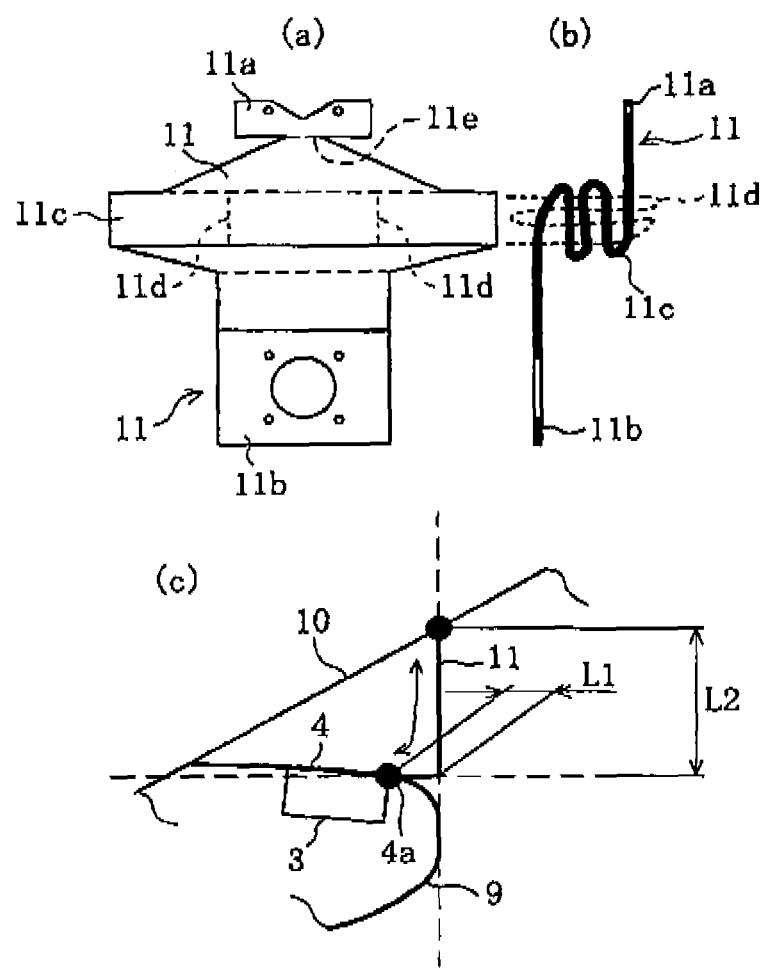

When the load applied to the deployment restriction sheet 11 reaches load B (FIG. 3(b)), the rupturable portion 11e ruptures. Following the rupture, the air bag 1 deploys with a predetermined deployment behavior (FIG. 3(c)), thereby cushioning an impact applied to the occupant. FIG. 4 is a view showing a state in which the air bag device according to the present invention is deployed when attached to a front seat.

To ensure that the air bag 1 deploys to the state shown in FIG. 4 with the deployment behavior shown in FIGS. 3(a) to 3(c), the length of the deployment restriction sheet 11 from a lid 4 in a direction extending toward the first end 11a from the second end 11b must correspond at least to a following length.

The length must correspond to a sum total of a length L1 of a straight line drawn from an occupant side hinge portion 4a of the lid 4 to a vertical line contacting an end surface of an instrument panel 9 and a length L2 on this vertical line drawn from an end of the straight line L1 to a windshield 10 (see FIG. 5(c)).

There are no particular limitations on the width dimension of the deployment restriction sheet 11 as long as the air bag 1 can perform the deployment behavior described above. However, the deployment restriction sheet 11 preferably has a larger width dimension than the air bag 1 stored in the air bag case 3.

The present invention is not limited to the example described above, and embodiments thereof may be modified appropriately within the scope of the technical spirit described in the claims.

For example, the air bag 1 may be stored in a box-shaped cloth case 12 having a development shape such as that shown in FIG. 7, in which at least an upper surface (a lid side) of the folded air bag 1 is exposed.

In this case, the deployment restriction sheet 11 may be formed by extending at least one side face of the cloth case 12 and folding a resulting extension portion 12a. In so doing, the number of constitutional components is reduced. At this time, the folded back portion 11c, which is formed at a midway point of the extension portion 12a, is provided with the tacking 11d, for example, so as to separate when the predetermined load A is applied. Further, the rupturable portion 11e that ruptures upon application of the predetermined load B, which is larger than the load A, is provided on a tip end side of the extension portion 12a positioned on the vehicle body front side.

When the air bag 1 is stored in the cloth case 12 formed integrally with the deployment restriction sheet 11 in this manner, the side wall of the air bag case 3 can be omitted.

The air bag device described above is a preferred example of the present invention, and other embodiments may be implemented or executed using various methods. In the absence of specific description to the contrary in the present specification, the present invention is not limited to the component shapes, sizes, constitutions, arrangements, and so on illustrated in detail in the attached drawings. Furthermore, the expressions and terminology used in the present specification are provided for descriptive purposes, and in the absence of specific description to the contrary, the present invention is not limited thereto.

For example, the manner in which the folded back portion 11c is joined is not limited to tacking as long as the folded back portion 11c separates upon application of the load A, and welding, adhesion, and so on may be used instead. Further, the rupturable portion 11e is not limited to perforations as long as it ruptures upon application of the load B.

Industrial Applicability

The air bag device according to the present invention is provided for use in an automobile, but similar effects are exhibited when the air bag device is provided in a vehicle other than an automobile, such as an airplane or a boat.

While presently preferred embodiments have been described, it should be understood that modifications may be made without departing from the invention. The scope of the invention is defined by the appended claims, and all devices that come within the meaning of the claims, either literally or by equivalence, are intended to be embraced therein. Furthermore, the advantages of the embodiments described above are not necessarily the only advantages of the embodiments, and it is not necessarily expected that all of the described advantages will be achieved with every embodiment.

The invention claimed is:

1. An air bag device comprising:
   an air bag having a folded configuration in a pre-deployment state;
   an inflator that supplies said air bag with a generated gas;
   an air bag case attached to said inflator, wherein said air bag is substantially disposed within said air bag case;
   a retainer fixing an opening portion of a peripheral edge of said air bag to said air bag case; and
   a deployment restriction sheet that covers said air bag from a rear side of a vehicle body to a front side of a vehicle body when said air bag is stored in said air bag case,
   wherein said deployment restriction sheet comprises a folded portion disposed over a central portion of said deployment restriction sheet, said folded portion being releasably joined to itself and said central portion so as to separate upon application of a first predetermined load, and said deployment restriction sheet further comprising a rupturable portion that ruptures upon application of a second predetermined load, said second load being greater than said first load, wherein said rupturable portion is disposed on a first end side of said deployment restriction sheet, said first end side being positioned on said front side of said vehicle body, and
   wherein said first end of said deployment restriction sheet is attached to a main body of said air bag at said front side of said vehicle, and a second end of said deployment restriction sheet is attached to said main body of said airbag at said rear side of said vehicle, wherein said folded portion is completely formed from a portion of said deployment restricted sheet that extend between said rupturable portion and said second end.

2. The air bag device according to claim 1, wherein said air bag substantially disposed in said air bag case is enclosed in a box-shaped cloth case having an open upper surface, and
   said first end of said deployment restriction sheet is attached to said cloth case and said second end of said deployment restriction sheet is fixed to said cloth case.

3. The air bag device according to claim 1, wherein said first end of said deployment restriction sheet is further attached to said air bag case.

4. An air bag device comprising:
   an air bag having a folded configuration in a pre-deployment state;
   an inflator that supplies said air bag with a generated gas;
   an air bag case attached to a cloth case and to said inflator;
   a retainer fixing an opening portion of a peripheral edge of said air bag to said cloth case; and
   a deployment restriction sheet that covers said air bag from a rear side of said vehicle body to a front side of said vehicle body when said air bag is substantially disposed in said cloth case in said folded configuration,
   wherein said cloth case is formed in a box shape such that at least an upper surface of said folded air bag oriented toward a lid of the airbag device is exposed, wherein said deployment restriction sheet is formed by extending at least one side face of said cloth case and folding a resulting extension portion to form a folded portion disposed at a central portion of said extension portion, said folded portion being releasably joined to itself and to said central portion so as to separate upon application of a first predetermined load, said extension portion further comprising a rupturable portion that ruptures upon application of a second predetermined load, said second predetermined load being greater than said first predetermined load, said rupturable portion being disposed on a tip end side of said extension portion, said tip end portion being disposed on said front side of said vehicle body with said folded portion being completely formed from a portion of said deployment restriction sheet that extends between said rupturable portion and said one side face of said cloth case from which said extension portion extends.

5. The air bag device according to claim 1, wherein said deployment restriction sheet is wider than said folded air bag.

6. The air bag device according to claim 4, wherein said deployment restriction sheet is wider than said folded air bag.

* * * * *

UNITED STATES PATENT AND TRADEMARK OFFICE
CERTIFICATE OF CORRECTION

PATENT NO. : 8,596,679 B2  Page 1 of 1
APPLICATION NO. : 12/672761
DATED : December 3, 2013
INVENTOR(S) : Horikawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 641 days.

Signed and Sealed this
Twenty-second Day of September, 2015

Michelle K. Lee
*Director of the United States Patent and Trademark Office*